United States Patent
Nemura et al.

(10) Patent No.: US 9,482,934 B2
(45) Date of Patent: Nov. 1, 2016

(54) PROJECTOR

(71) Applicant: Seiko Epson Corporation, Tokyo (JP)

(72) Inventors: Akira Nemura, Azumino (JP); Masayuki Okoshi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 154 days.

(21) Appl. No.: 14/032,658

(22) Filed: Sep. 20, 2013

(65) Prior Publication Data

US 2014/0092371 A1  Apr. 3, 2014

(30) Foreign Application Priority Data

Sep. 28, 2012 (JP) ................. 2012-215818

(51) Int. Cl.
*G03B 21/14* (2006.01)
*G02B 7/02* (2006.01)

(52) U.S. Cl.
CPC ............. *G03B 21/142* (2013.01); *G02B 7/022* (2013.01); *G02B 7/023* (2013.01)

(58) Field of Classification Search
CPC ........ G03B 21/142; G03B 5/06; G03B 5/04; G03B 2205/0023; G03B 21/14; G03B 21/145; G03B 21/147; G02B 7/023; G02B 7/022; G02B 27/0025
USPC .............................. 353/100, 101, 119, 69, 70
See application file for complete search history.

(56) References Cited

U.S. PATENT DOCUMENTS

| | | | | |
|---|---|---|---|---|
| 4,606,628 A | * | 8/1986 | Vance ...................... | G03B 5/06 348/785 |
| 6,416,184 B1 | * | 7/2002 | Arai et al. ...................... | 353/52 |
| 2002/0154278 A1 | * | 10/2002 | Masuda ........................ | 353/101 |
| 2005/0030491 A1 | * | 2/2005 | Gishi ...................... | G02B 7/023 353/101 |
| 2006/0146298 A1 | * | 7/2006 | Lin ............................... | 353/101 |
| 2007/0132961 A1 | | 6/2007 | Kuroki et al. | |
| 2013/0120720 A1 | * | 5/2013 | Hellin .................... | G02B 7/021 353/101 |

FOREIGN PATENT DOCUMENTS

| | | | | |
|---|---|---|---|---|
| BE | WO 2012013675 A1 | * | 2/2012 | ............. G02B 7/021 |
| CN | 102566228 A | | 7/2012 | |
| JP | 61-173933 U | | 10/1986 | |
| JP | 2001-222081 A | | 8/2001 | |
| JP | 2004-004206 A | | 1/2004 | |
| JP | 2004-205686 A | | 7/2004 | |
| JP | 2007-163653 A | | 6/2007 | |
| JP | 2010-276895 A | | 12/2010 | |

* cited by examiner

*Primary Examiner* — Bao-Luan Le
*Assistant Examiner* — Christopher Lamb, II
(74) *Attorney, Agent, or Firm* — ALG Intellectual Property, LLC

(57) ABSTRACT

A projector includes: an optical unit body having a light modulating apparatus configured to modulate an optical flux emitted from a light source according to image information; a projection lens configured to project the optical flux modulated by the light modulating apparatus; and an adjusting mechanism configured to adjust an inclination of the projection lens with respect to the optical unit body. The adjusting mechanism includes; a supporting portion configured to support the projection lens; a base portion configured to constitute part of the optical unit body; a clamping portion configured to clamp the base portion in cooperation with the supporting portion; a fixing member configured to fix the supporting portion to the clamping portion; and adjusting members configured to be capable of adjusting a distance between the base portion and the supporting portion.

12 Claims, 12 Drawing Sheets

PROJECTOR

CROSS REFERENCE TO RELATED APPLICATIONS

This application claims priority to Japanese Patent Application No. 2012-215818 filed on Sep. 28, 2012, the entire contents of which are incorporated by reference herein.

BACKGROUND

1. Technical Field

The present invention relates to a projector.

2. Related Art

In the related art, a projector including a light modulating apparatus configured to modulate an optical flux emitted from a light source and a projection lens configured to project the modulated optical flux is known. In recent years, a projector capable of a large-screen projection and projecting on a projecting surface arranged in the proximity of the projector (proximity projection) is required. In order to achieve the large-screen or the proximity projection, the projection lens is increased in size and weight, and hence a phenomenon in which the projection lens falls (inclines) forward under its own weight with respect to a member to which the projection lens is mounted occurs. When the projection lens inclines, an image to be projected is subjected to partial lack of focus within the projection surface of the image even when the focus is adjusted, so that a lens mounting apparatus which allows adjustment of an inclination of the projection lens is proposed (for example see JP-A-2010-276895).

The lens mounting apparatus described in JP-A-2010-276895 is provided with a projection lens unit, and a lens mounter for mounting the projection lens unit.

The projection lens unit includes a flange portion that comes into abutment with the lens mounter, and a bayonet engaging claw configured to fit in a notch of the lens mounter.

The lens mounter includes a lens mount body having a notched portion, a leaf spring pressing the bayonet engaging claw, an angle adjusting plate for adjusting a mounting angle of the projection lens unit in the direction of the optical axis, the angle adjusting plate coming into abutment with the flange portion of the projection lens unit, an angle adjusting screw, an angle adjusting plate fixing screw, and a control pin provided between the angle adjusting plate and the bayonet engaging claw so as to be held while being maintained with its posture.

The angle adjusting plate and the lens mount body is fixed by an angle adjusting plate fixing screw, and the control pin is provided so as to come into abutment at one end thereof with the angle adjusting plate and at the other end thereof with an inside of the leaf spring.

The lens mounting apparatus described in JP-A-2010-276895 is configured in such a manner that the angle adjusting plate comes apart from the lens mount body by loosening the angle adjusting plate fixing screw and rotating the angle adjusting screw, and the control pin moves toward the angle adjusting plate while maintaining the state in which the control pin comes into abutment with the angle adjusting plate. Then, the bayonet engaging craw moves in the same manner as the angle adjusting plate until coming into contact with the control pin via the leaf spring. Consequently, the projection lens unit is adjusted in inclination with respect to the optical axis of the apparatus body.

However, the technology described in JP-A-2010-276895 does not disclose whether the apparatus includes one each of the angle adjusting screw and the angle adjusting plate fixing screw, if there are pluralities of the angle adjusting screws and the angle adjusting plate fixing screws are included, how these screws are arranged two-dimensionally, and hence has a risk of giving an excessive load (bending stress) to the angle adjusting plate depending on the method of adjustment. In addition, the technology disclosed in JP-A-2010-276895 is the technology to be applied to the bayonet structure using the leaf spring, and has a problem that this technology cannot be applied to the structure in which the leaf spring is not used.

SUMMARY

An advantage of some aspects of the invention is to solve at least a part of the problems described above, and the invention can be implemented as the following forms or application examples.

Application Example 1

A projector according to this application example of the invention includes: an optical unit body having a light modulating apparatus configured to modulate an optical flux emitted from a light source according to image information; a projection lens configured to project the optical flux modulated by the light modulating apparatus; and an adjusting mechanism configured to adjust an inclination of the projection lens with respect to the optical unit body, wherein the adjusting mechanism includes: a supporting portion configured to support the projection lens; a base portion configured to constitute part of the optical unit body; a clamping portion configured to clamp the base portion in cooperation with the supporting portion; a fixing member configured to fix the supporting portion to the clamping portion; and adjusting members configured to be capable of adjusting a distance between the base portion and the supporting portion.

In this configuration, the adjusting mechanism is configured as described above, when the fixing member is operated so that the fixation between the supporting portion and the clamping portion is released, the supporting portion is brought into a state in which the distances to the clamping portion and to the base portion are changeable. When the adjusting member is operated and the distance between the base portion and the supporting portion is changed in this state, the inclination of the supporting portion with respect to the base portion, that is, the inclination of the projection lens supported by the supporting portion may be adjusted. Therefore, the inclination of the projection lens with respect to the optical unit body under its own weight may be adjusted. Therefore, the projector is capable of projecting an image in which out-of-focus within the projecting surface is suppressed.

In addition, since adjustment is achieved without applying an excessive load on members such as the supporting portion, the base portion, and the clamping portion when adjusting the inclination, the projector which is provided with the adjusting mechanism by suppressing increase in size and weight of the adjusting mechanism and hence the projector without the necessity of excessively reinforcing the respective members may be provided.

Since the configuration described above may be applied to a structure in which the projection lens is fixed to the supporting portion with a screw or the like or the bayonet structure or the like in which the projection lens is supported by the supporting portion via the leaf spring or the like so as to be demountably mounted, the projector which can adjust the inclination of the projection lens is achieved without being restricted by the supporting structure of the projection lens.

Application Example 2

In the projector according to the above-described application example, it is preferable that the adjusting members are arranged on both sides of a plane in the perpendicular direction and a plane in the horizontal direction including the optical axis of the projection lens in a posture of installation of the projector.

In this configuration, at least four of the adjusting members are provided, and are arranged on both sides of a plane in the perpendicular direction (perpendicular plane) and a plane in the horizontal direction (horizontal plane) including the optical axis of the projection lens. Accordingly, the inclination of the projection lens in the perpendicular direction can be adjusted in the posture of installation of the projector by the adjusting members arranged on both sides in the horizontal plane, and the inclination of the projection lens in the horizontal direction can be adjusted in the posture of the installation of the projector by the adjusting members arranged on both sides of the perpendicular plane. Therefore, the distance between the base portion and the supporting portion may be adjusted in a well balanced manner, and the adjusting operation for adjusting the inclination of the projection lens may be efficiently performed.

Application Example 3

In the projector according to above-described application example, it is preferable that the adjusting members each includes a head portion at one end portion thereof and the other end portion is screwed into the base portion, and the adjusting members each support the supporting portion by coming into abutment at the head portion thereof with the supporting portion by being rotated, thereby adjusting the distance between the base portion and the supporting portion.

In this configuration, the distance between the base portion and the supporting portion may be adjusted by changing the amount of projection of the adjusting members from the base portion by rotating the adjusting members projecting from the base portion and bringing the head portion into abutment with the supporting portion. Accordingly, since the connection between the supporting portion and the adjusting members is not necessary, the distance between the base portion and the supporting portion can be adjusted in a simple configuration and a simple operation, and hence the inclination of the projection lens can be adjusted.

Application Example 4

In the projector according to the above-described application example, it is preferable that the projector further includes an exterior housing constituting an exterior, wherein the exterior housing includes: a first housing including the fixing member and an opening portion configured to expose the adjusting member, a second housing configured to cover the fixing member and the adjusting member and configured to be mountable/demountable with respect to the first housing.

In this configuration, since the exterior housing is provide with the above-described first housing and the second housing, the second housing can be removed easily from the first housing when adjusting the inclination of the projection lens, and the second housing can be mounted on the first housing easily when the adjustment is terminated. Accordingly, members other than the second housing from among the members which constitute the projector need not to be disassembled, so that the adjustment of the inclination of the projection lens can easily achieved and, simultaneously, improvement in appearance of the projector when the second housing is mounted is achieved.

By the provision of the second housing, an opening surface area of the opening portion provided on the exterior housing may be reduced to suppress entry of the dust from the outside to the inside of the projector.

Application Example 5

In the projector according to the above-described application example, it is preferable that the second housing includes: a cover body configured to cover the fixing member and the adjusting members, and an auxiliary member engaged with the first housing and the cover body, and fixes the cover body to the first housing.

In this configuration, the second housing, including the above-described cover body and the auxiliary member, is mounted on the first housing by engaging the auxiliary member with the cover body and the first housing. Accordingly, the second housing can be mounted on the first housing easily without providing members such as screws for mounting the second housing or without using a tool or the like.

BRIEF DESCRIPTION OF THE DRAWINGS

The invention will be described with reference to the accompanying drawings wherein like numbers reference like elements.

DESCRIPTION OF EXEMPLARY EMBODIMENTS

Figure 1:
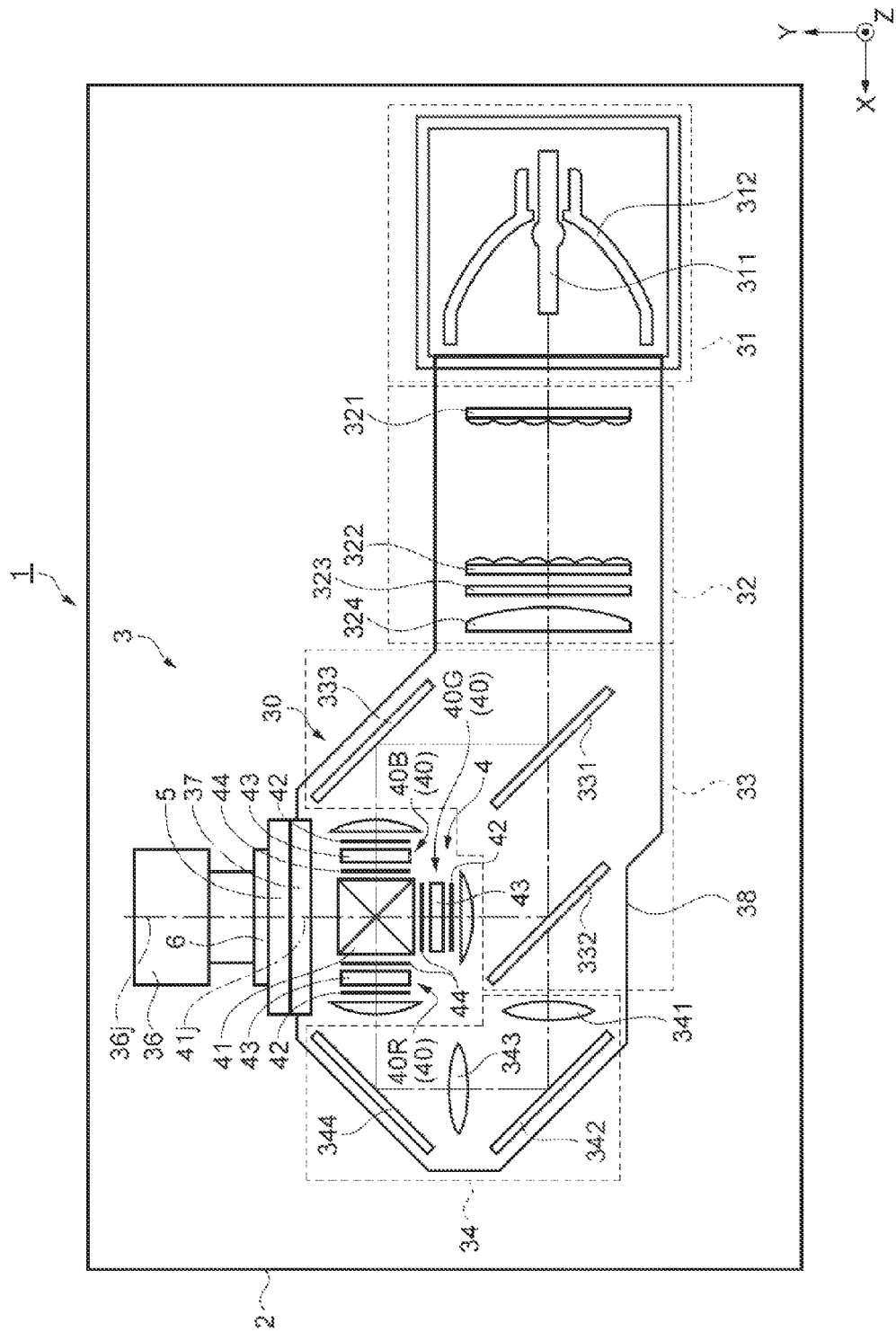
FIG. 1 is a diagrammatic drawing illustrating a schematic configuration of a projector of an embodiment.

Referring now to the drawings, a projector according to an embodiment will be described. The projector of the embodiment is configured to modulate an optical flux emitted from a light source according to image information and project an image on a projected surface such as a screen. The projector of the embodiment is configured to be capable of stationary installation in which the projector is installed on a desk or the like, hanging installation in which the projector is installed in a state of being inverted upside down in contrast to the stationary installation, and installation in postures different from the stationary installation and the hanging installation.

Principal Configuration of Projector

FIG. 1 is a diagrammatic drawing illustrating a schematic configuration of a projector 1 of the embodiment.

The projector 1 includes an exterior housing 2 constituting an exterior, a control unit (not illustrated), and an optical unit 3 having a light source apparatus 31 and a projection lens 36 as illustrated in FIG. 1. Although not illustrated in the drawing, alight source apparatus configured to supply power to the power source apparatus 31 and the control unit, and also a cooling apparatus configured to cool the optical unit 3 or the like are arranged in the interior of the exterior housing 2.

The projector 1 of the embodiment includes a lens shift mechanism 5 configured to move the projection lens 36, and is configured to be capable of moving an image projected on the screen or the like. The projector 1 of the embodiment includes an adjusting mechanism 6 capable of adjusting the inclination of the projection lens 36. In the following description, the direction in which a light flux goes out from the projection lens 36 is defined as the front side and the upper side of the projector 1 in stationary installation is defined the an upper side for the sake of convenience of description.

Figure 2:
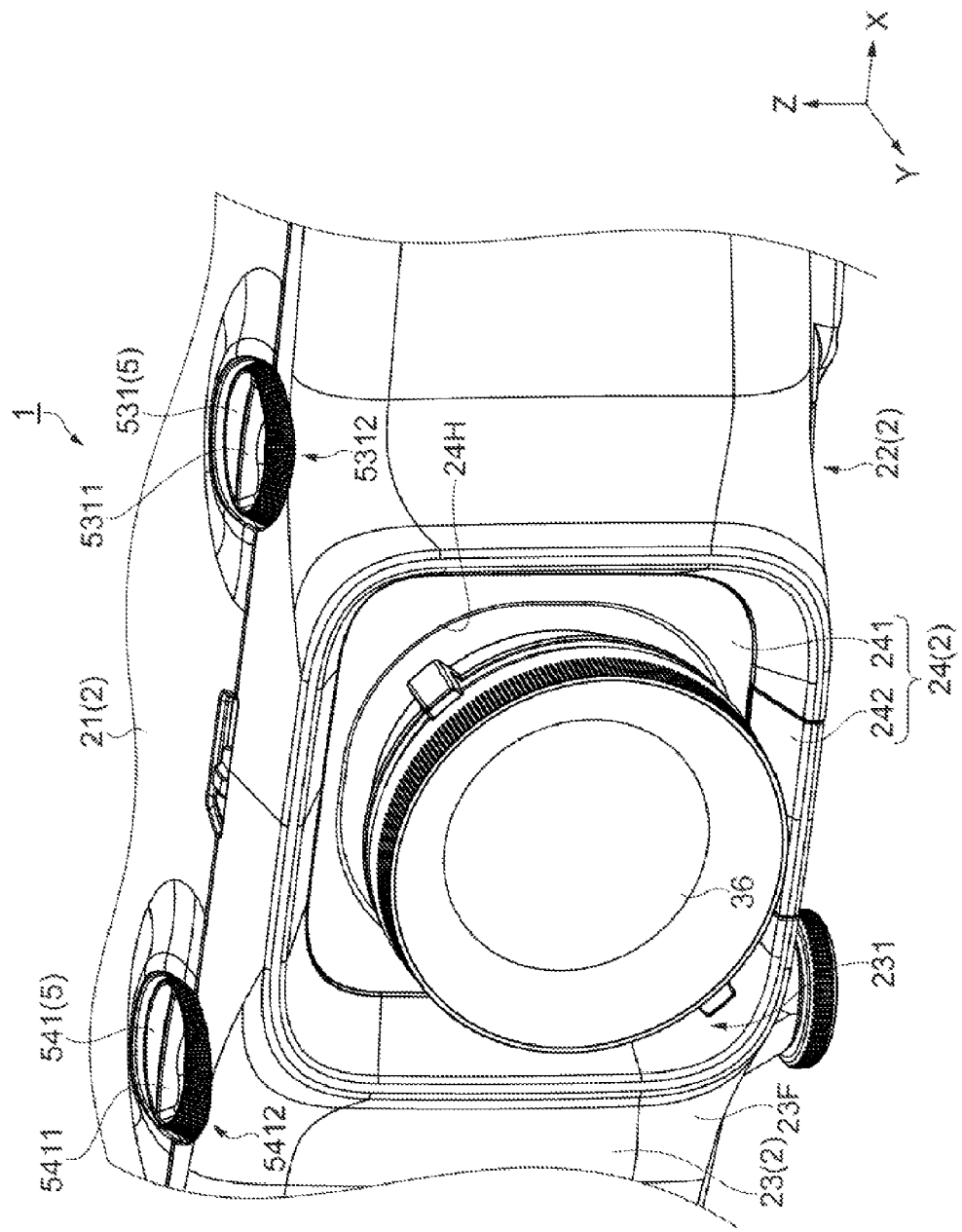
FIG. 2 is a perspective view illustrating part of an appearance of the projector of the embodiment.

FIG. 2 is a perspective view illustrating part of an appearance of the projector 1 near the projection lens 36.

The exterior housing 2 is formed of a synthetic resin and, as illustrated in FIG. 2, includes an upper case 21 configured to form an upper portion of the exterior housing 2, a lower case 22 configured to form a lower portion, and a front case 23 as a first housing configured to form a front portion, and a cover 24 as a second housing.

The upper case 21 and the front case 23 are formed so as to expose dials 531 and 541 for operating the lens shift mechanism 5 at a boundary portion of these members as illustrated in FIG. 2.

The front case 23 is formed with a depression 231 at a center portion of a front surface 23F, an opening portion 231H (see FIG. 9) from which a distal end portion of the projection lens 36 is exposed and for operating the adjusting mechanism 6 is provided at a bottom portion of the depression 231.

the cover 24 includes an opening portion 24H for exposing the distal end portion of the projection lens 36, and is formed so as to cover part of the opening portion 231H. The cover 24 is configured so as to be mountable/demountable with respect to the front case 23, and is moved away from the front case 23 when the adjusting mechanism 6 is operated. The shapes of the cover 24 and the front case 23 in the vicinity of the cover 24 are described in detail later.

Although the illustration is omitted, the exterior housing 2 is provided with an air intake port for taking in outside air and an exhaust port for exhausting warmed air in the interior of the exterior housing 2 to the outside.

The control unit including a CPU (Central Processing Unit), an ROM (Read Only Memory), an RAM (Random Access Memory) functions as a computer, and performs control of the operation of the projector 1, for example, control relating to projection of images.

Configuration of Optical Unit

The optical unit 3 optically processes an optical flux emitted from the light source apparatus 31 and projects the same under the control of the control unit.

The optical unit 3 includes, in addition to the light source apparatus 31, an integrator illuminating optical system 32, a color separating optical system 33, a relay optical system 34, an optical apparatus 4, the projection lens 36, a head member 37, the lens shift mechanism 5, the adjusting mechanism 6, and an optical component housing 38 configured to arrange these members at predetermined positions on an optical path as illustrated in FIG. 1.

The optical unit 3 is formed into a substantially L-shape in plan view as illustrated in FIG. 1, and includes the light source apparatus 31 demountably arranged at one end portion thereof and the projection lens 36 arranged on the other end portion thereof. In the following description, a direction in which the optical flux goes out from the light source apparatus 31 is described as +X direction, a direction in which the optical flux projected from the projector 1 goes out is described as +Y direction (forward direction), and an upper direction is described as +Z direction for the sake of convenience of description. The ±X direction is defined as a lateral direction.

The light source unit 31 includes a light source 311 of a discharge type including an extra-high pressure mercury lamp or a metal halide lamp and a reflector 312, and is configured to reflect an optical flux emitted from the light source 311 by the reflector 312, and cause the reflected optical flux to go out toward the integrator illuminating optical system 32.

The integrator illuminating optical system 32 includes a first lens array 321, a second lens array 322, a polarization conversion element 323, and a superimposing lens 324, and is configured so that the optical flux emitted from the light source apparatus 31 is irradiated substantially uniformly on the surface of a liquid crystal light valve 43 described later and is used effectively.

The color separating optical system 33 includes two dichroic mirrors 331 and 332 and a reflection mirror 333, and has a function to split the optical flux going out from the integrator illuminating optical system 32 into three color lights; a red light (hereinafter, referred to as "R-light"), a green light (hereinafter, referred to as "G-light"), and a blue light (hereinafter, referred to as "B-light").

The relay optical system 34 includes an incident-side lens 341, a relay lens 343, and reflection mirrors 342 and 344, and has a function to guide the R-light separated by the color separating optical system 33 to the liquid crystal light valve 43 for the R-light. The optical unit 3 has such a configuration that the relay optical system 34 guides the R-light, the invention is not limited thereto, and a configuration in which the B-light is guided is also applicable, for example.

The optical apparatus 4 includes electric optical apparatuses 40 provided for the respective color lights (an R-light electric optical apparatus is denoted by 40R, a G-light electric optical apparatus is denoted by 40G, and a B-light electric optical apparatus is denoted by 40B), and a cross-dichroic prism 41 as a color combining optical apparatus.

The respective electric optical apparatuses 40 each include an incident-side polarizer 42, the liquid crystal light valve 43 as a light modulating apparatus, and an outgoing side polarizer 44, and modulate each color light according to the image information.

The cross dichroic prism 41 is formed into a substantially square shape in plan view by bonding four rectangular prisms, and two dielectric multilayer films are formed at an interface of bonded rectangular prisms. The cross-dichroic prism 41 is configured to reflect color lights modulated by the electric optical apparatus 40R and 40B from the dielectric multilayer films, allow color light modulated by the electric optical apparatus 40G to pass therethrough to combine the respective color lights, and let the combined color light goes out to the projection lens 36 along an optical axis 41j.

Figure 3:
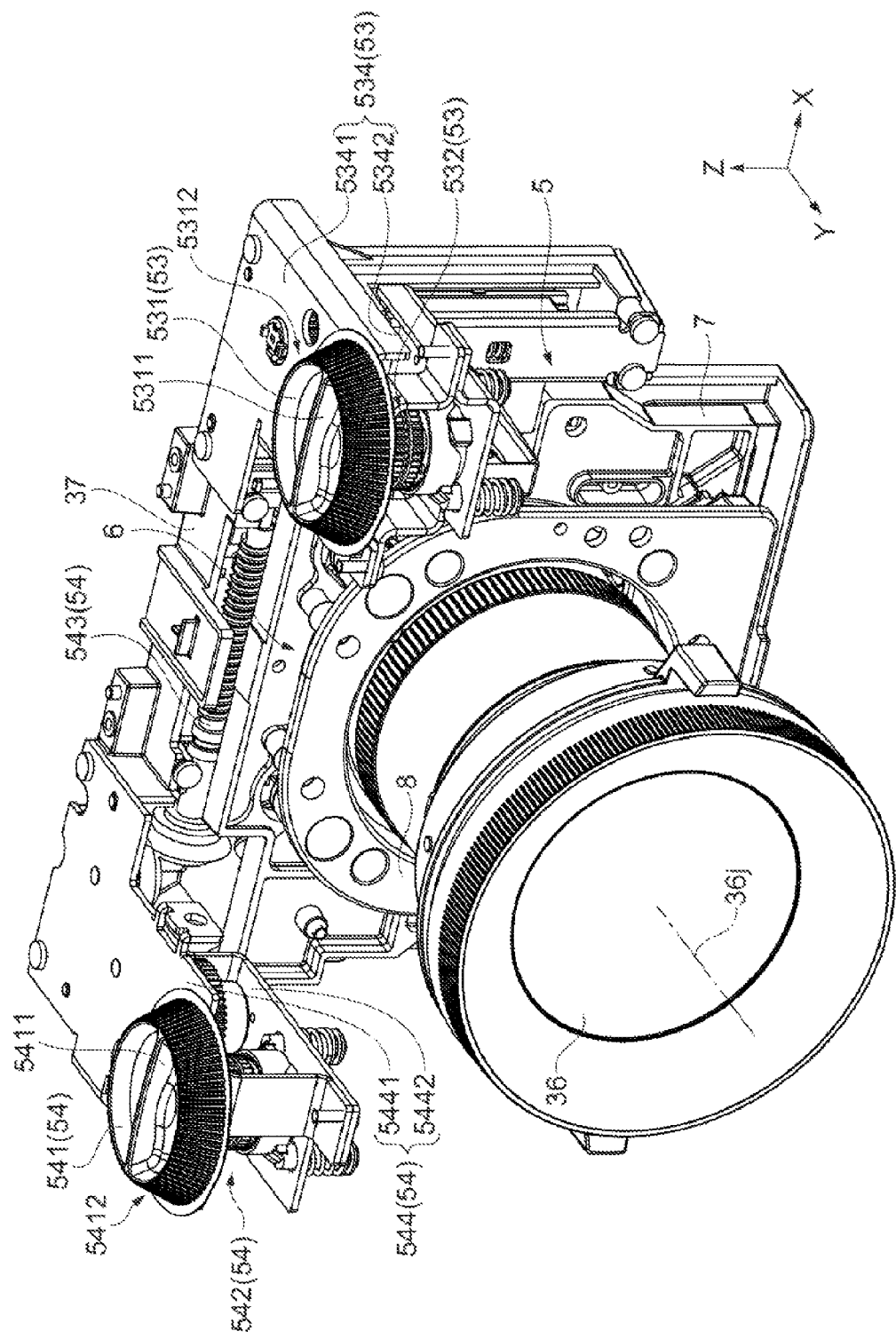
FIG. 3 is a perspective view of a projection lens, a head body, a lens shift mechanism, and an adjustment mechanism of the embodiment.
Figure 4:
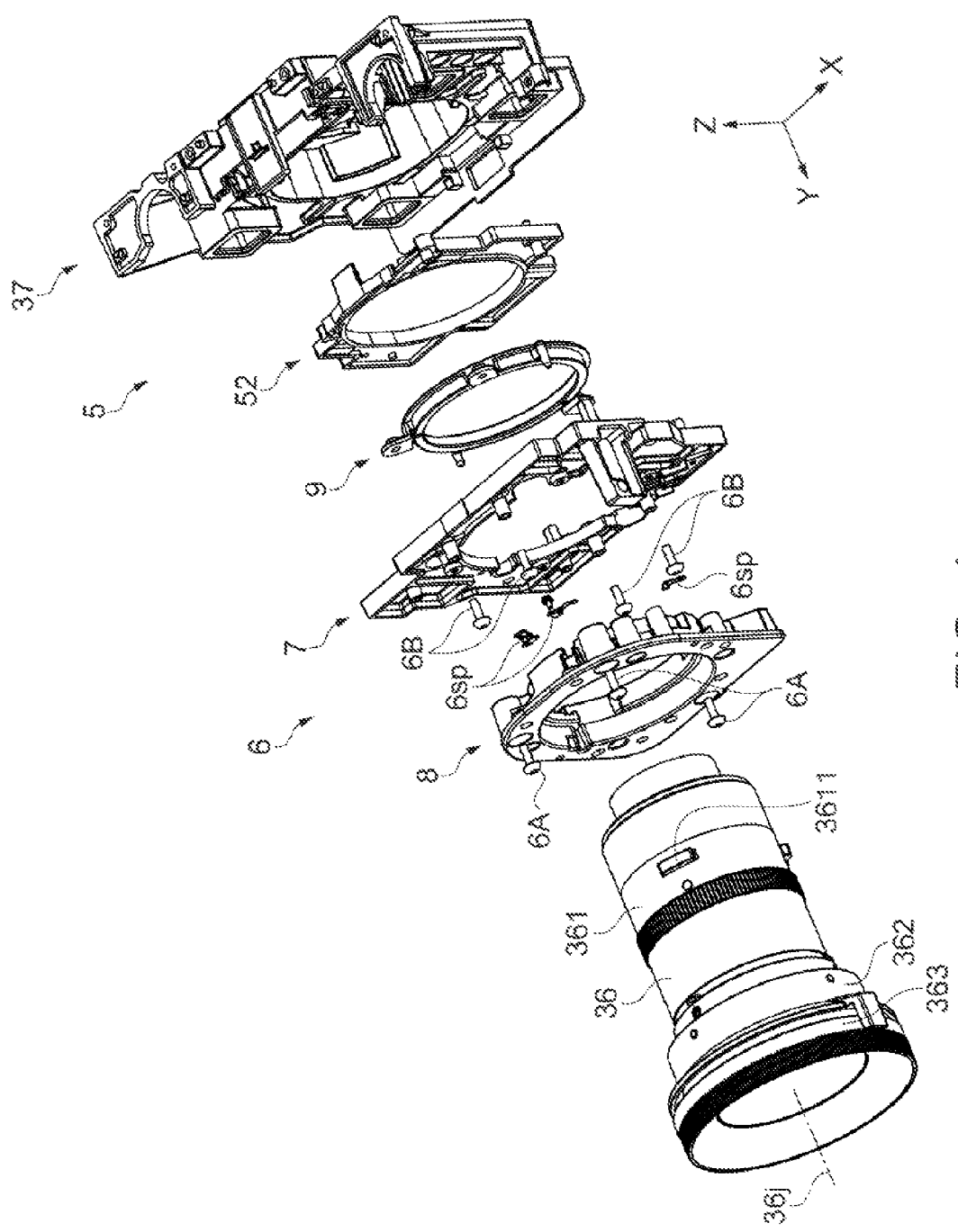
FIG. 4 is an exploded perspective view for explaining the principal configuration of the lens shift mechanism and the adjusting mechanism of the embodiment.

FIG. 3 is a perspective view of the projection lens 36, the head member 37, the lens shift mechanism 5, and the adjusting mechanism 6. FIG. 4 is an exploded perspective view for explaining the principal configuration of the lens shift mechanism 5 and the adjusting mechanism 6.

The projection lens 36 includes a plurality of lenses (not illustrated) arranged along an optical axis 36j and projects the light combined by the cross-dichroic prism 41 on the screen in an enlarged scale.

The projection lens 36 includes a lens barrel 361 configured to store a plurality of lenses therein, a zoom ring 362 disposed on the front side of the lens barrel 361 and having diameters larger than the lens barrel 361, and a focus ring 363 as illustrated in FIG. 4.

Three projecting portions 3611 are provided on an outer periphery of the lens barrel 361 at the same interval of 120° in the direction of circumference about the optical axis 36j.

The head member 37 supports the lens shift mechanism 5 and is mounted on the optical component housing 38. The head member 37 is provided with a restricting portion configured to restrict movements of the projection lens 36 in the vertical direction and the lateral direction, and the projection lens 36 is configured to be movable in a range restricted by the restricting portion.

The lens shift mechanism 5 includes a base portion 7 movable in the vertical direction (±Z direction) (see FIG. 3 and FIG. 4), and a left and right movable portion 52 movable in the lateral direction (±X direction) (see FIG. 4) although detailed configuration will be described later.

The base portion 7 supports the projection lens 36 via a supporting portion 8, described later, of the adjusting mechanism 6. The lens shift mechanism 5 causes the projection lens 36 to move in a vertical direction (±Z direction) and a lateral direction (±X direction) by the dials 531 and 541 being rotated by a manual operation.

The adjusting mechanism 6 includes a supporting portion 8 configured to support the projection lens 36 as illustrated in FIG. 3, and is configured to be capable of adjusting the falling of the projection lens 36 with respect to the base portion 7, although detailed configuration will be described later. The optical component housing 38, optical components stored in the optical component housing 38, the head member 37, and the base portion 7 are configured as a optical unit body 30.

Principal Configuration of Lens Shift Mechanism

Here, the lens shift mechanism 5 will be described in detail.

The lens shift mechanism 5 includes a first gear train mechanism 53 and a second gear train mechanism 54 as illustrated in FIG. 3 in addition to the base portion 7 and the left and right movable portion 52 as illustrated in FIG. 4.

The base portion 7 is arranged in front of the head member 37 and is configured to be movable in the vertical direction (±Z direction) orthogonal to the optical axis 41j with respect to the head member 37 by the rotation of a dial 531. The base portion 7 is restricted in movement in the vertical direction by the restricting portions provided on the head member 37, and is configured to be movable freely within the range restricted by the restricting portion. The base portion 7 also constitutes part of the adjusting mechanism 6. Detailed description of the shape of the base portion 7 will be described later.

The left and right movable portion 52 is arranged between the head member 37 and the base portion 7 as illustrated in FIG. 4. The left and right movable portion 52 guides the movement of the base portion 7 in the vertical direction (±Z direction) and is configured to be movable in the lateral direction (±X direction) orthogonal to the optical axis 41j together with the base portion 7 by the rotation of a dial 541. In other words, the projection lens 36 supported by the base portion 7 via the supporting portion 8 is configured to be movable in the vertical direction with respect to the left and right movable portion 52, and is configured to be movable in the lateral direction together with the left and right movable portion 52. The left and right movable portion 52 is restricted in movement in the lateral direction by the restricting portions provided on the head member 37, and is configured to be movable freely within the range restricted by the restricting portion.

The first gear train mechanism 53 is a mechanism configured to move the base portion 7 in the vertical direction, and includes the dial 531, a plurality of transmission gears 532, a lead screw (not illustrated), and a frame 534, as illustrated in FIG. 3.

The dial 531 generates a drive force for moving the base portion 7 in the vertical direction by being rotated by a user. The dial 531 is arranged on the upper side in the vicinity of an end portion on the +X side of the lens shift mechanism 5 as illustrated in FIG. 3.

The dial 531 has a shape such as a conical shape from which a distal end portion is cut off, and is arranged so as to be rotatable about a center axis of rotation extending along the vertical direction as illustrated in FIG. 3. The dial 531 is provided with a depression on an upper surface thereof, and a rib 5311 which allows the user to pinch is formed at a center portion of the depression. Then, the dial 531 is formed with a patterned indent for preventing slippage when being operated by the user on a side surface 5312 thereof.

The dial 531 is arranged so that the rib 5311 is exposed on the upper surface of the exterior housing 2 and part of the side surface 5312 is exposed from the front side (the side facing the projecting surface) of the exterior housing 2 as illustrated in FIG. 2. Then, the dial 531 is formed so as to allow the rotating operation with the rib 5311 pinched (upper surface operation) and the rotating operation (side surface operation) by pressing the side surface 5312 in the direction of tangent thereof.

Although the description of the plurality of the transmission gears 532 will be omitted, the transmission gears 532 transmit a drive force generated by the rotation of the dial 531 to the lead screw of the first gear train mechanism 53.

The lead screw of the first gear train mechanism 53 is formed with screw groove on an outer surface thereof, is arranged about a center axis of rotation extending along the vertical direction, and rotates by a drive force transmitted from the transmission gears 532.

The frame 534 supports the dial 531 and the plurality of the transmission gears 532, and is mounted on the head member 37. The frame 534 includes an upper frame 5341 and a lower frame 5342 positioned below the upper frame 5341, as illustrated in FIG. 3.

The upper frame 5341 and the lower frame 5342 are formed of metal sheet by pres work or the like, the dial 531 is positioned above the upper frame 5341, and the plurality of the transmission gears 532 is supported so as to be positioned between the upper frame 5341 and the lower frame 5342. The upper frame 5341 and the lower frame 5342 are fixed by a screw.

A towing member (not illustrated) configured to tow the base portion 7 engages the lead screw of the first gear train mechanism 53, and the towing member is provided with a projecting portion which is locked by the base portion 7 in the vertical direction.

When the dial 531 is rotated, the lead screw rotates via the plurality of transmission gears 532, and the towing member engaging the lead screw moves in accordance with the direction of rotation of the dial 531. Consequently, the base portion 7, that is, the projection lens 36 moves in the vertical direction. The lens shift mechanism 5 of the embodiment is configured in such a manner that when the dial 531 is rotated clockwise when viewed from the top, the projection lens 36 moves upward, and when the dial 531 is rotated counterclockwise, the projection lens 36 is moved downward.

The second gear train mechanism 54 is a mechanism configured to move the base portion 7, that is, the projection lens 36 in the lateral direction by moving the left and right movable portion 52 in the lateral direction, and includes the dial 541, the plurality of transmission gears 542, the lead screw 543, and a frame 544 as illustrated in FIG. 3.

The dial 541 includes a member common to the dial 531, and generates a drive force for moving the left and right movable portion 52 in the lateral direction by the rotation operation of the user. The dial 541 is arranged on the upper side near the end portion of the lens shift mechanism 5 on the −X side so as to be rotatable about a center axis of rotation extending along the vertical direction in the same manner as the dial 531 as illustrated in FIG. 3.

The dial 541 is arranged so that a rib 5411 is exposed on the upper side of the exterior housing 2 and part of a side surface 5412 is exposed on the front side of the exterior housing 2 in the same manner as the dial 531 as illustrated in FIG. 2. Then, the dial 541 is configured so as to be rotated by the upper surface operation or the side surface operation in the same manner as the dial 531.

Although the description of the plurality of the transmission gears 542 will be omitted, the transmission gears 542 transmit a drive force generated by the rotation of the dial 541 to the lead screw 543.

The lead screw 543 is formed with screw groove on an outer surface thereof, is arranged about a center axis of rotation extending along the lateral direction, and rotates by a drive force transmitted from the transmission gears 542.

The frame 544 supports the dial 541 and the plurality of the transmission gears 542, and is mounted on the head member 37. The frame 544 includes an upper frame 5441 and a lower frame 5442 positioned below the upper frame 5441 as illustrated in FIG. 3.

The upper frame 5441 and the lower frame 5442 are formed of metal sheet by press work or the like, the dial 541 is positioned above the upper frame 5441, and the plurality of the transmission gears 542 is supported so as to be positioned between the upper frame 5441 and the lower frame 5442. The upper frame 5441 and the lower frame 5442 are fixed by a screw.

A towing member (not illustrated) configured to tow the left and right movable portion 52 engages the lead screw 543, and the towing member is provided with a projecting portion which is locked by the left and right movable portion 52 in the lateral direction.

When the dial 541 is rotated, the lead screw 543 rotates via the plurality of transmission gears 542, and the towing member engaging the lead screw 543 moves in accordance with the direction of rotation of the dial 541. Consequently, the left and right movable portion 52, that is, the projection lens 36 moves in the lateral direction. The lens shift mechanism 5 of the embodiment is configured in such a manner that when the dial 541 is rotated clockwise when viewed from the top, the projection lens 36 moves in the +X direction, and when the dial 541 is rotated counterclockwise, the projection lens 36 is moved −X direction.

Configuration of Adjusting Mechanism

The adjusting mechanism 6 includes the base portion 7, the supporting portion 8, a clamping portion 9, leaf springs 6sp, the fixing screw 6A as a fixing member, a adjusting screw 6B as an adjusting member, and a shipping screw 6C (see FIG. 9) as illustrated in FIG. 4.

Figure 5:
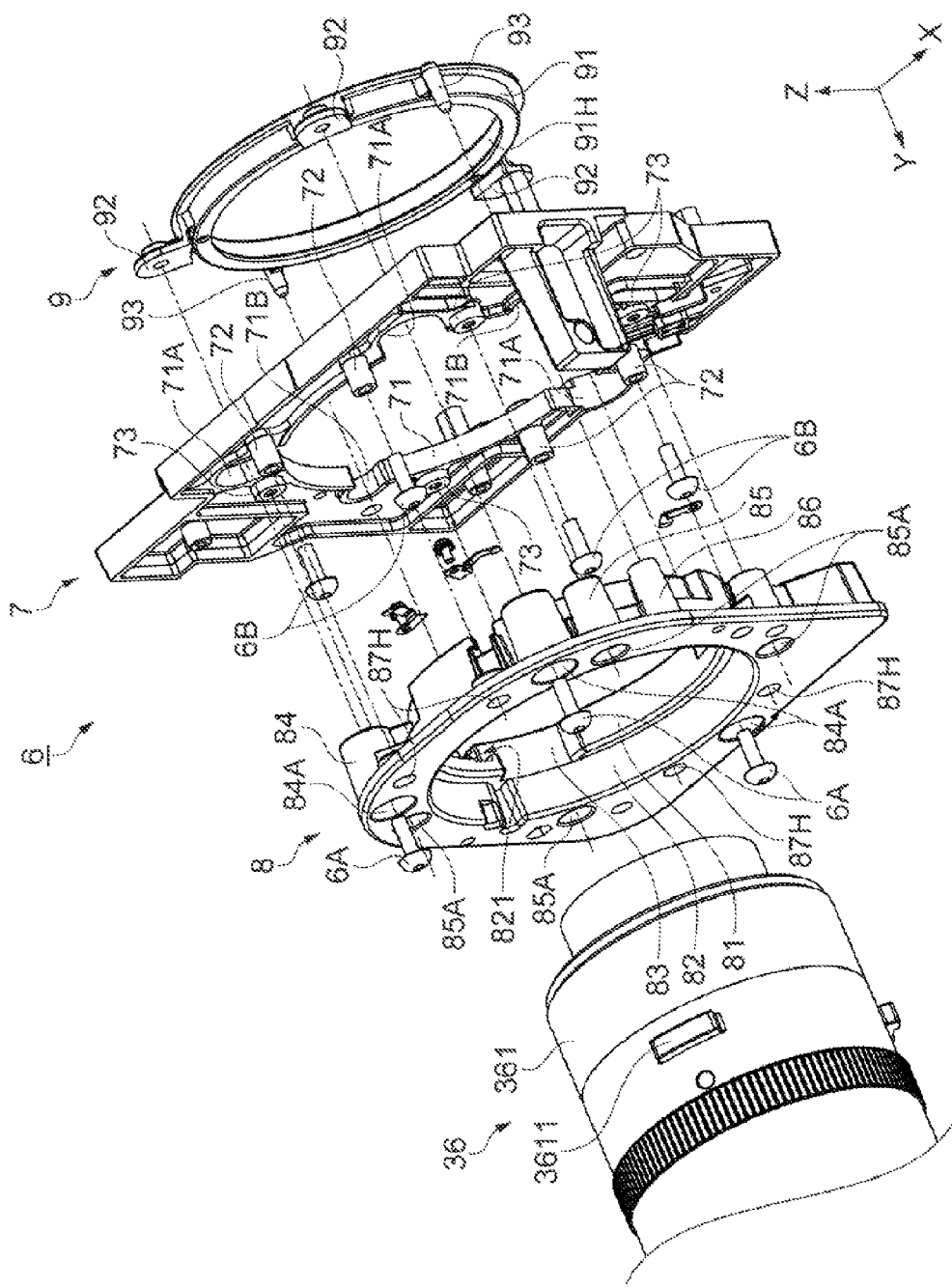
FIG. 5 is an exploded perspective view of the adjusting mechanism of the embodiment.
Figure 6:
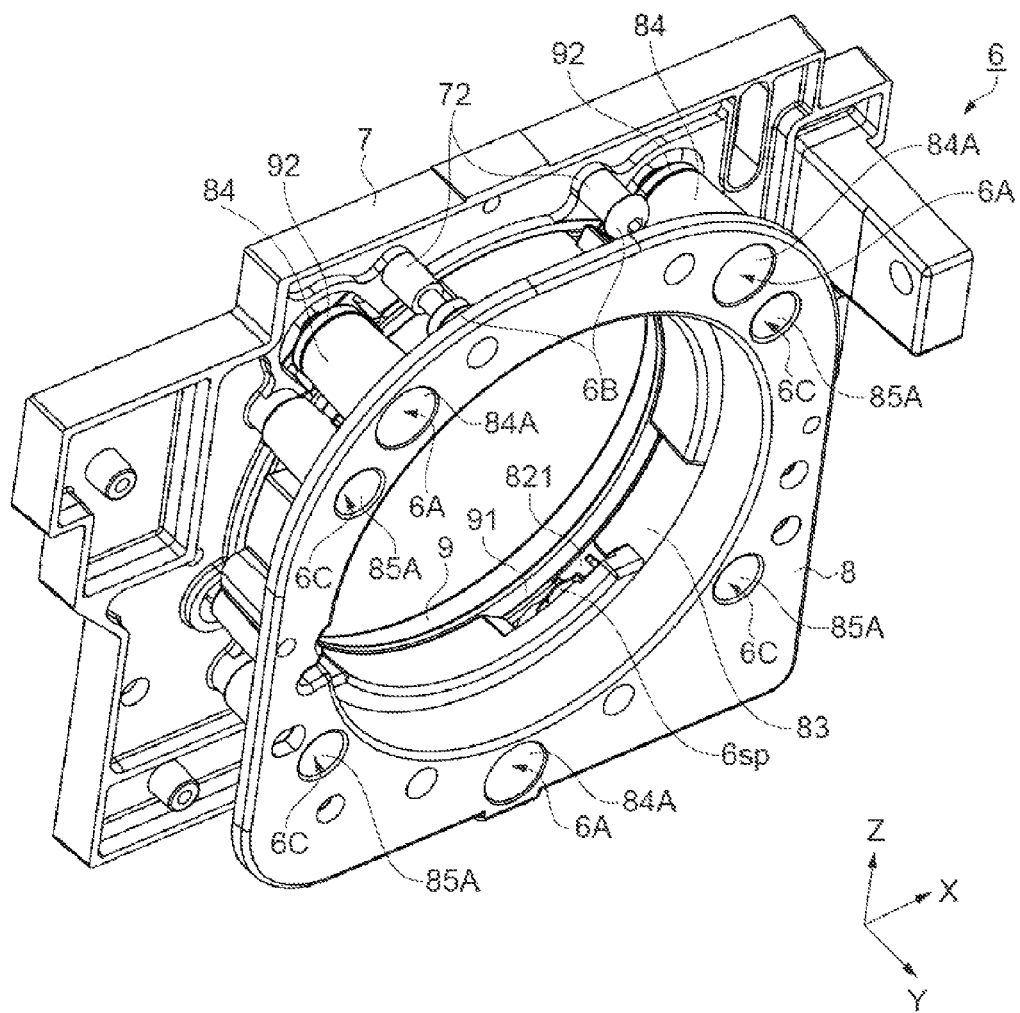
FIG. 6 is a perspective view of the adjusting mechanism of the embodiment.

FIG. 5 is an exploded perspective view of the adjusting mechanism 6. FIG. 6 is a perspective view of the adjusting mechanism 6.

The base portion 7 is formed into a substantially rectangular shape in plan view as illustrated in FIG. 5, and is provided with an insertion hole 71 having a circular shape in plan view in which the lens barrel 361 of the projection lens 36 is inserted at a center thereof. Then the base portion further includes fixing portion insertion holes 71A connecting to an inner peripheral edge portion of the insertion hole 71 and a guide pin insertion holes 71B.

The fixing portion insertion holes 71A are formed at one position on the lower side of the insertion hole 71 and two positions substantially in lateral symmetry on an upper side of the insertion hole 71. The guide pin insertion holes 71B are formed at one position each on the left and right of the insertion hole 71.

Bosses 72 and 73 formed with a screw groove are provided on the front side of the base portion 7.

The bosses 72 are provided on both sides of the fixing portion insertion hole 71A provided on the lower side of the insertion hole 71 and in the vicinities of the two fixing portion insertion holes 71A provided on the upper side of the insertion hole 71 so as to project toward the projection lens 36. In other words, the bosses 72 are formed on both sides in a plane in the perpendicular direction (perpendicular plane) and in a plane in the horizontal direction (horizontal plane) including the optical axis 36j of the projection lens in a state of the stationary installation of the projector 1. Then, adjusting screws 6B are screwed on the screw groove of the boss 72.

The bosses 73 are formed to have a smaller amount of projection than the bosses 72, and the four bosses 73 are provided at substantially same intervals on the outer periphery of the insertion hole 71. The shipping screws 6C are screwed into the screw grooves of the bosses 73.

The supporting portion 8 is arranged forwardly of the base portion 7, and is configured to support the projection lens 36 by a bayonet structure using the leaf springs 6sp.

The supporting portion 8 is provided with an insertion hole 81 having a circular shape in plan view and allowing the lens barrel 361 of the projection lens 36 to be inserted therethrough at a center thereof as illustrated in FIG. 5, and the supporting portion 8 is formed, at the front surface thereof, with a depression 82 having a substantially circular shape in plan view and capable of inserting the projection lens 36 provided with three projecting portions 3611 thereto.

Then, the depression 82 is formed with notched portions 83 which allows insertion of the three projecting portions 3611 therethrough on a surface on the side of the bottom surface (−Y side).

A depression 821 depressed on the −Y side is provided in the vicinity of the edge portions of the notched portions 83 in the circumferential direction. The leaf springs 6*sp* are arranged in the depression 821 as illustrated in FIG. 6.

Figure 7:
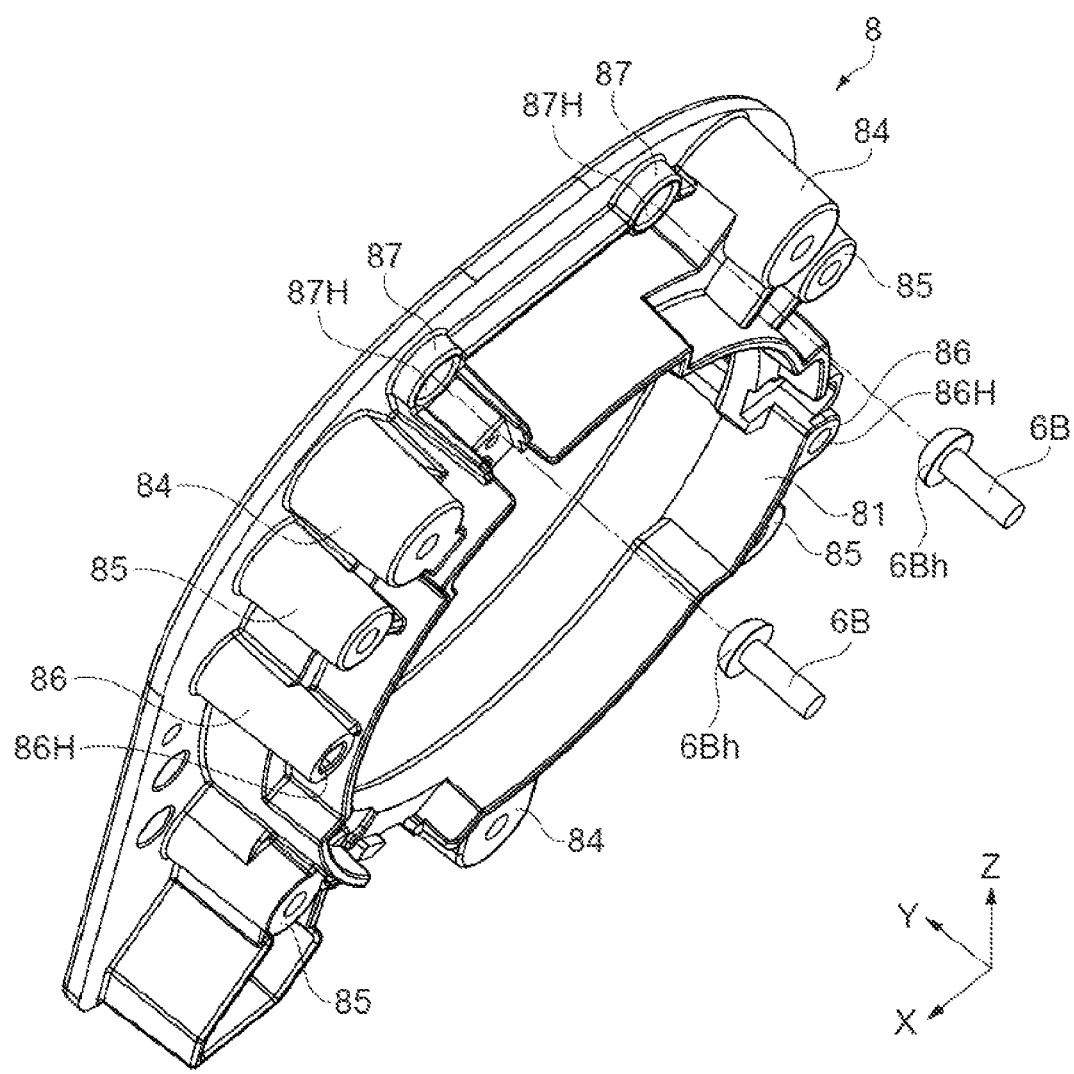
FIG. 7 is a perspective view of the supporting portion of the embodiment viewed obliquely from the rear.

FIG. 7 is a perspective view of the supporting portion 8 viewed obliquely from rear.

The supporting portion 8 is formed so as to project rearward (the base portion 7 side) at a peripheral edge of the insertion hole 81 as illustrated in FIG. 7.

The supporting portion 8 is provided with cylindrical bosses 84 and 85 and column-shaped guide bosses 86 projecting rearward.

The bosses 84 are formed at positions corresponding to the fixing portion insertion holes 71A of the base portion 7 as illustrated in FIG. 5 and FIG. 7, each include an opening portion 84A on a front surface thereof and a round hole which allows insertion of a screw portion of the fixing screw 6A on a bottom surface thereof.

The bosses 85 are formed at positions corresponding to the boss 73 of the base portion 7, and each include an opening portion 85A on a front surface thereof and are provided with a round hole which allows insertion of a screw portion of the shipping screw 6C on a bottom surface thereof.

The guide bosses 86 are formed at positions corresponding to the guide pin insertion holes 71B of the base portion 7 and each include on the rear surface thereof a guide holes 86H to which the guide pin 93 described later of the clamping portion 9 is inserted.

The supporting portion 8 is provided with cylindrical screw receiving portions 87 projecting by an amount smaller than that of the bosses 84 and 85 as illustrated in FIG. 7.

The screw receiving portion 87 is formed at a position corresponding to the boss 72 of the base portion 7.

The screw receiving portions 87 are formed so as to allow screw heads (head portions 6Bh) of the adjusting screw 6B screwed into the bosses 72 to come into abutment therewith when adjusting the degree of falling of the projection lens 36, and are each formed with a through hole 87H having a size enough for insertion of a jig (distal end portion of a screw driver) for rotating the adjusting screw 6B at a center thereof.

The clamping portion 9 is arranged at the rear of the base portion 7 as illustrated in FIG. 5, and clamps the base portion 7 with the supporting portion 8.

The clamping portion 9 includes a body portion 91 having a substantially circular shape in plan view, fixing portions 92, and guide pins 93 as illustrated in FIG. 5.

The body portion 91 is formed to have a size on a front side thereof to be inserted into the insertion hole 71 of the base portion 7, and at a rear side thereof to come into abutment with the peripheral edge portion of the insertion hole 71. The body portion 91 includes an insertion hole 91H which allows insertion of the lens barrel 361 of the projection lens 36 therethrough at a center thereof.

The fixing portions 92 are portions to which the supporting portion 8 is fixed and, as illustrated in FIG. 5, three of the fixing portions 92 are inserted into the fixing portion insertion hole 71A of the base portion 7 and provided corresponding to the three bosses 84 of the supporting portion 8 respectively. Then, the fixing portions 92 are each formed with a screw groove in which the fixing screw 6A is screwed.

Two of the guide pins 93 are formed so as to be inserted into the two guide holes 86H of the supporting portion 8 and are positioned in the direction of the X-Z plane between the supporting portion 8 and the clamping portion 9.

The fixing screws 6A are inserted respectively through the three opening portions 84A of the supporting portion 8, screwed into the screw grooves of the fixing portions 92 of the clamping portion 9, whereby the supporting portion 8 is fixed to the clamping portion 9.

The adjusting screws 6B each include a head portion 6Bh at one end portion thereof, and the other end side thereof is screwed into a screw groove of each of the four bosses 72 of the base portion 7, that is, the adjusting screws 6B are arranged on both sides thereof with respect to a plane in the perpendicular direction and a plane in the horizontal direction including the optical axis 36*j* of the projection lens in the state of the stationary installation of the projector 1.

The adjusting screws 6B adjusts the distance between the base portion 7 and the supporting portion 8 by the head portions 6Bh coming into abutment with the screw receiving portions 87 by being rotated and by supporting the supporting portion 8.

In this embodiment, a common screw is used both as the fixing screw 6A and the adjusting screw 6B, and a so-called a bind screw or a truss screw having a distal end of the head portion 6Bh formed into a projecting curved surface, and having a large diameter is used.

The shipping screws 6C are provided so that the adjusting mechanism 6 is fixed reliably to the optical unit body 30 before an inclination adjustment of the projection lens 36, that is, in a state of shipment of the projector 1. The shipping screws 6C are inserted from the opening portions 85A of the supporting portion 8, are screwed into the screw grooves of the bosses 73 of the base portion 7, and fix the supporting portion 8 to the base portion 7. The shipping screws 6C are removed from the adjusting mechanism 6 when the adjustment inclination of the projection lens 36 is performed.

The adjusting mechanism 6 is assembled in the following manner.

First of all, the adjusting screws 6B are screwed into the boss 72 of the base portion 7. In this case, the adjusting screws 6B may be screwed so that the amount of projection from the bosses does not exceed a predetermined amount so as to avoid abutment of the adjusting screws 6B with the supporting portion 8 assembled later.

Subsequently, the supporting portion 8 is mounted to the clamping portion 9 which is inserted from behind of the base portion 7. Specifically, as illustrated in FIG. 6, the fixing screws 6A are inserted from the opening portions 84A to fix the supporting portion 8 to the clamping portion 9 (the boss 84 and the fixing portions 92 are brought into abutment).

Subsequently, the shipping screws 6C are inserted from the opening portion 85A to fix the supporting portion 8 to the base portion 7.

With the procedure described thus far, the assembly of the adjusting mechanism 6 is terminated.

The lens barrel 361 of the projection lens 36 is inserted through the insertion hole 81 with the projecting portions 3611 aligned with the notched portions 83 of the supporting portion 8. Then, the projection lens 36 is rotated about the optical axis 36*j* when the projecting portions 3611 comes into abutment with the body portion 91 of the clamping portion 9 and the projecting portions 3611 are fixed by being clamped by the leaf springs 6sp and the body portion 91. The rotation of the projection lens 36 is controlled by a locking mechanism, not illustrated, so that a state in which the projecting portions 3611 is clamped between the leaf springs 6sp and the body portion 91 is locked. By the operation of a release button, not illustrated, of the locking mechanism, the locked state is released, so that the removal of the projection lens 36 is enabled.

Adjusting Method

Subsequently, an adjusting method for adjusting the inclination of the projection lens 36 will be described. Here, an adjusting method when the projector 1 is installed stationarily will be described.

Figure 8A:
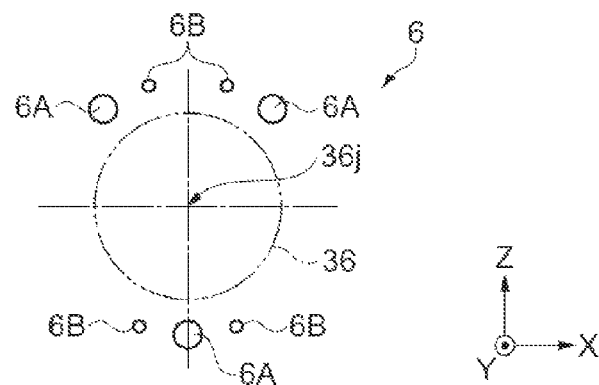
FIGS. 8A to 8E illustrate schematic views of the adjusting mechanism for explaining an adjusting method of the embodiment.
Figure 8B:
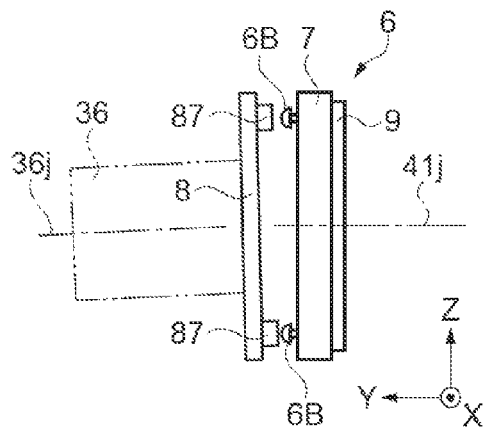
Figure 8C:
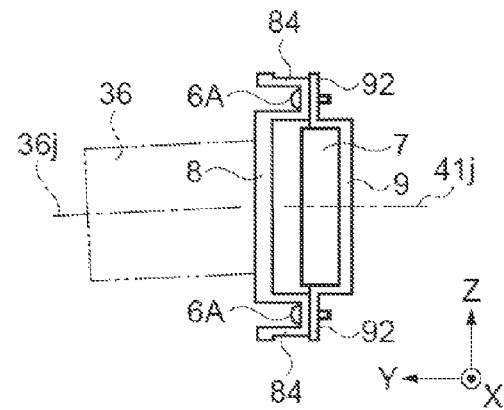
Figure 8D:
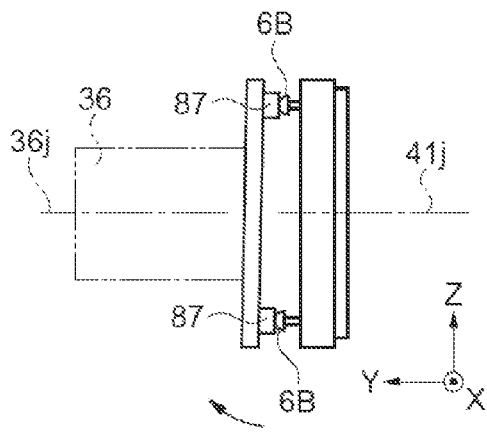
Figure 8E:
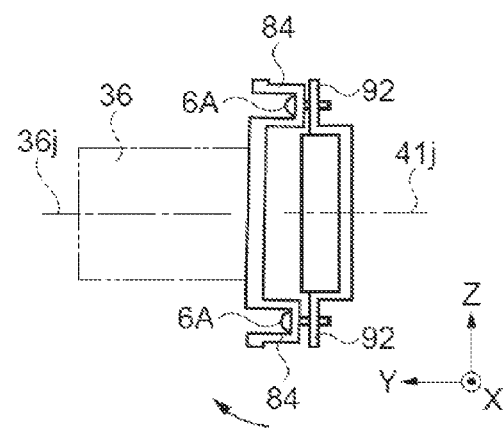

FIGS. 8A to 8E are schematic diagrams of the adjusting mechanism 6 for explaining the adjusting method. FIG. 8A is a plan view illustrating an arrangement of the fixing screws 6A and the adjusting screws 6B in the adjusting mechanism 6. FIGS. 8B and 8C are drawings illustrating the adjusting mechanism 6 before the adjustment, and FIGS. 8D and 8E are drawings illustrating the adjusting mechanism 6 after the adjustment. FIGS. 8A to 8E illustrate respective components in shapes and ratios different from the actual shapes and ratios for clarifying the state of the respective components.

The adjusting screws 6B are arranged on both sides thereof with respect to a plane in the perpendicular direction and a plane in the horizontal direction including the optical axis 36j in the state of the stationary installation of the projector 1 as described above, and as illustrated in FIG. 8A.

The fixing screws 6A are arranged in the vicinity of the two adjusting screws 6B below the projection lens 36 and above the projection lens 36 as illustrated in FIG. 8A. The shipping screws 6C are removed from the adjusting mechanism 6 when the adjustment of inclination of the projection lens 36 is performed as described above.

The adjusting mechanism 6 before the adjustment is in an initial state in which the adjusting screws 6B are apart from the supporting portion 8 (the screw receiving portions 87) as illustrated in FIG. 8B, and the bosses 84 and the fixing portion 92 are in abutment with each other by the fixing screws 6A as illustrated in FIG. 8C.

The projection lens 36 before the adjustment is inclined so that the distal end side is positioned at a lower level than the rear end side thereof under its own weight, and the optical axis 36j is also in the inclined state with respect to the optical axis 41j. Although illustration is omitted, the image projected on the projecting surface becomes partially out of focus within a projecting plane of the image when the projection lens 36 is inclined even when the focus adjustment is performed.

The inclination of the projection lens 36 is adjusted by projecting an image for adjustment on the projecting surface.

First of all, the three fixing screws 6A are loosened by a predetermined amount. By loosening the respective fixing screws 6A from the initial state, the supporting portion 8 and the clamping portion 9 are supported by the base portion 7 with play corresponding to the loosened amount of the respective fixing screws 6A.

Subsequently, the fixing screws 6A and the adjusting screws 6B are rotated so that the image to be projected is focused on the plane while observing the projected image for adjustment to bring the adjusting screws 6B into abutment with the respective screw receiving portions 87 (see FIG. 8D). In this adjusting operation, in addition to such the adjustment in the vertical direction that the distal end side moves upward, an adjustment of the inclination of the projection lens 36 may also be performed in the lateral direction. Then, the projection lens 36 is adjusted in inclination so that the optical axis 36j is brought into a substantially parallel state with the optical axis 41j.

In a state in which the inclination is adjusted, the boss 84 and the fixing portion 92 are brought into a state apart from each other by a distance corresponding to the amount of adjustment as illustrated in FIG. 8E. The supporting portion 8 is fixed to the base portion 7 by being supported by the four adjusting screws 6B, and being fixed to the clamping portion 9 by the fixing screws 6A, whereby the projection lens 36 supported by the supporting portion 8 is maintained in a state in which the inclination is adjusted.

The operation to adjust the inclination of the projection lens 36 is terminated.

When the projector 1 in which the inclination of the projection lens 36 is adjusted is installed in a different posture, the adjusting mechanism 6 is restored to an initial state and the adjustment is performed in the procedure described above.

Configurations of Cover and Front Case in the vicinity of Cover

Here, the shape of the cover 24 of the exterior housing 2 and the front case 23 in the vicinity of the cover 24 will be described in detail.

First of all, the front case 23 will be described.

The front case 23 is formed so as to allow the adjustment of an inclination of the projection lens 36 by removal of the cover 24.

Figure 9:
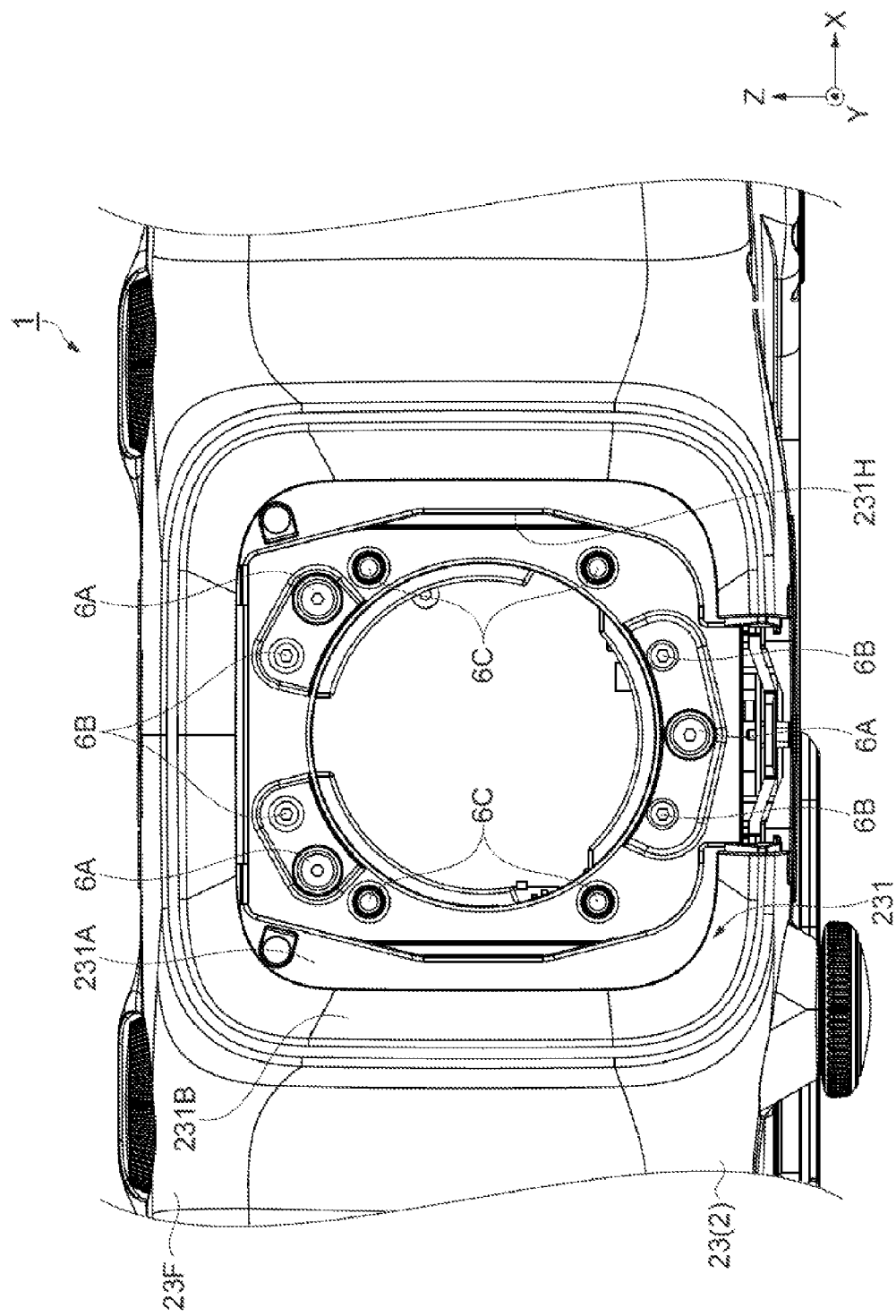
FIG. 9 is a plan view of the projector in a state in which the projection lens and the cover are removed and viewed from the front of the embodiment.
Figure 10:
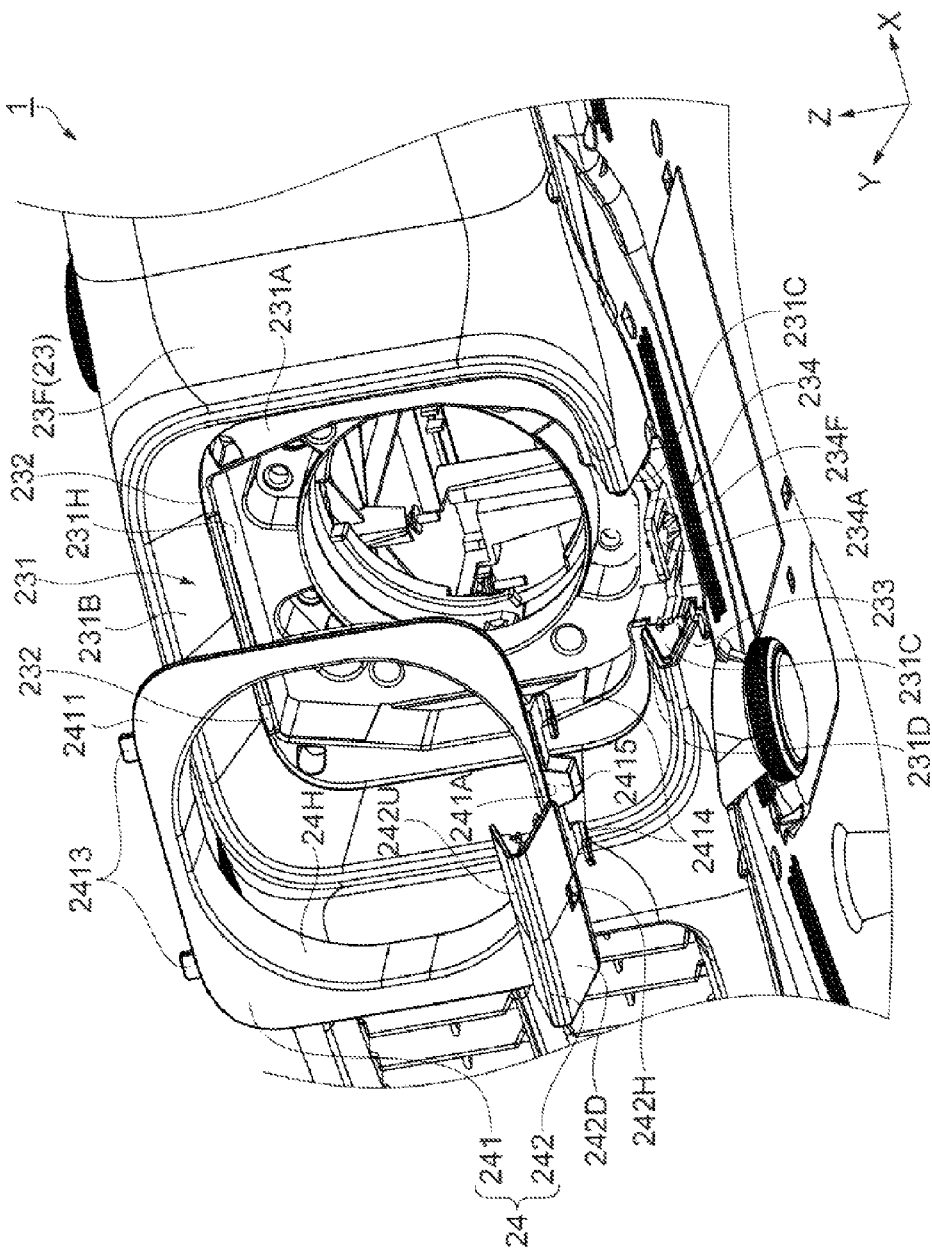
FIG. 10 is a perspective view of the projector of the embodiment in a state in which the cover is disassembled.

FIG. 9 is a plan view of the projector 1 in a state in which the projection lens 36 and the cover 24 are removed and viewed from the front. FIG. 10 is a perspective view of the projector 1 in which the projection lens 36 is removed and the cover 24 is disassembled.

A depression 231 of the front case 23 is formed so that a side surface 231B is inclined so that the bottom surface 231A side (−Y side) is smaller than the front surface 23F side and the outline of an edge portion on the front surface 23F side and the bottom surface 231A presents a substantially rectangular shape when viewed from the front as illustrated in FIG. 9 and FIG. 10.

The opening portion 231H provided on the bottom surface 231A is formed so as to allow exposure of the fixing screws 6A, the adjusting screws 6B and the shipping screws 6C. Then, as illustrated in FIG. 10, rectangular shaped engaging holes 232 are formed in the vicinity of the both upper corners of the bottom surface 231A.

The front case 23 includes a shape in which part of the lower side of the depression 231 is notched as illustrated in FIG. 10. With the notched shape, a pair of opposed surfaces 231C opposing each other in the lateral direction (±X direction) are provided, and shoulder portions 231D which correspond to inner sides of the front surface 23F and the side surfaces 231B are provided on edge portions of the opposed surfaces 231C.

Then, the engaging portions 233 are formed respectively on the pair of opposed surfaces 231C and a projecting portion 234 is provided between the pair of the opposed surfaces 231C.

As illustrated in FIG. 10, the projecting portion 234 is formed in a rectangular shape when viewed from below, and a deflecting portion 234A which is deflectable in the vertical direction is formed at a center thereof. A hook portion 234F projecting downward is provided at a distal end portion of the deflecting portion 234A.

A pair of the engaging portions 233 are formed so as to be in symmetry with each other.

Figure 11:
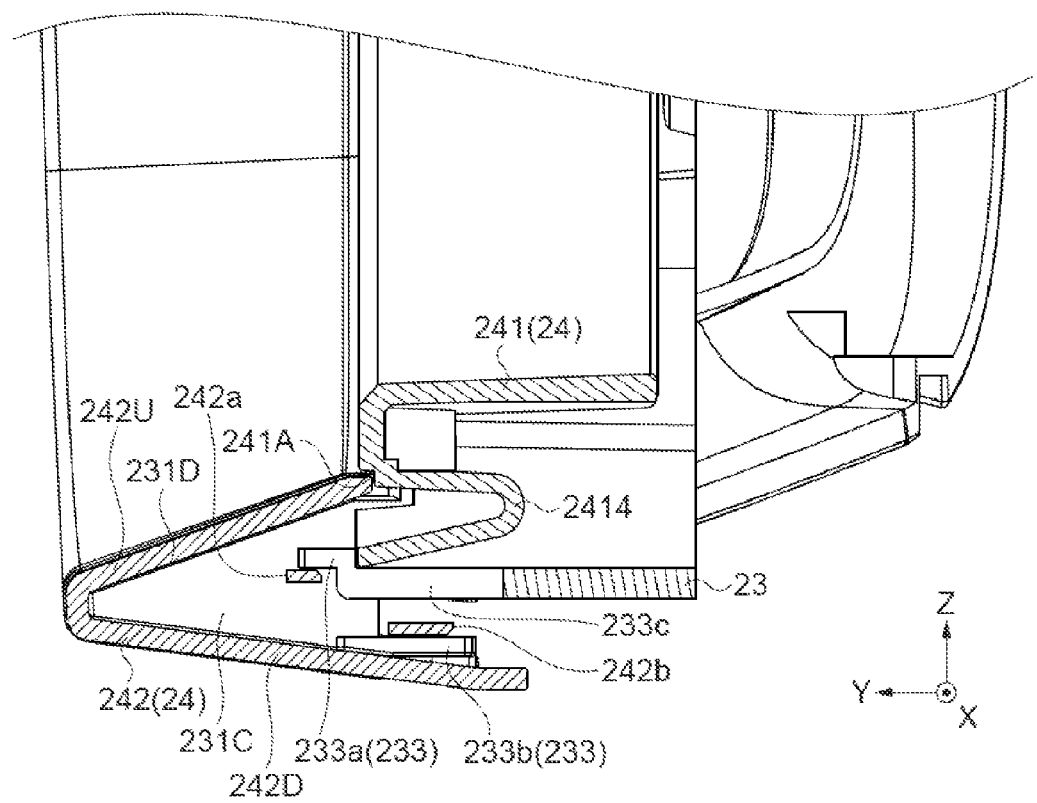
FIG. 11 is a cross-sectional view illustrating an engaging portion and a cover in the vicinity of the engaging portion of the embodiment.

FIG. 11 is a cross-sectional view illustrating one (−X side) of the engaging portions 233 and the cover 24 in the vicinity of the engaging portion 233.

The engaging portion 233 includes a first engaging portion 233a and a second engaging portion 233b as illustrated in FIG. 11.

The first engaging portion 233a is provided at a substantially center portion in the vertical direction (±Z direction) rather on the rear side (−Y side) of the opposed surface 231C as illustrated in FIG. 11, and is formed into a rectangular shape longer in the fore-and-aft direction (±Y direction) than the vertical direction in the view illustrated in FIG. 11. Then, the opposed surface 231C is formed with an extending portion 233c connected to a lower side of a rear end side of the first engaging portion 233a and extending rearward.

The second engaging portion 233b is formed below the first engaging portion 233a as illustrated in FIG. 11, and has a shape in which a lower front side is removed obliquely from a rectangular shape being longer in the fore-and-aft direction than in the vertical direction in the view illustrated in FIG. 11.

Subsequently, the cover 24 will be described.

The cover 24 is formed so as to cover part of the opening portion 231H of the front case 23 to hide the fixing screws 6A, the adjusting screws 6B and the shipping screws 6C from the outside, and is configured to be demountably mounted on the front case 23.

The cover 24 includes a cover body 241 and an auxiliary member 242 as illustrated in FIG. 10.

Figure 12:
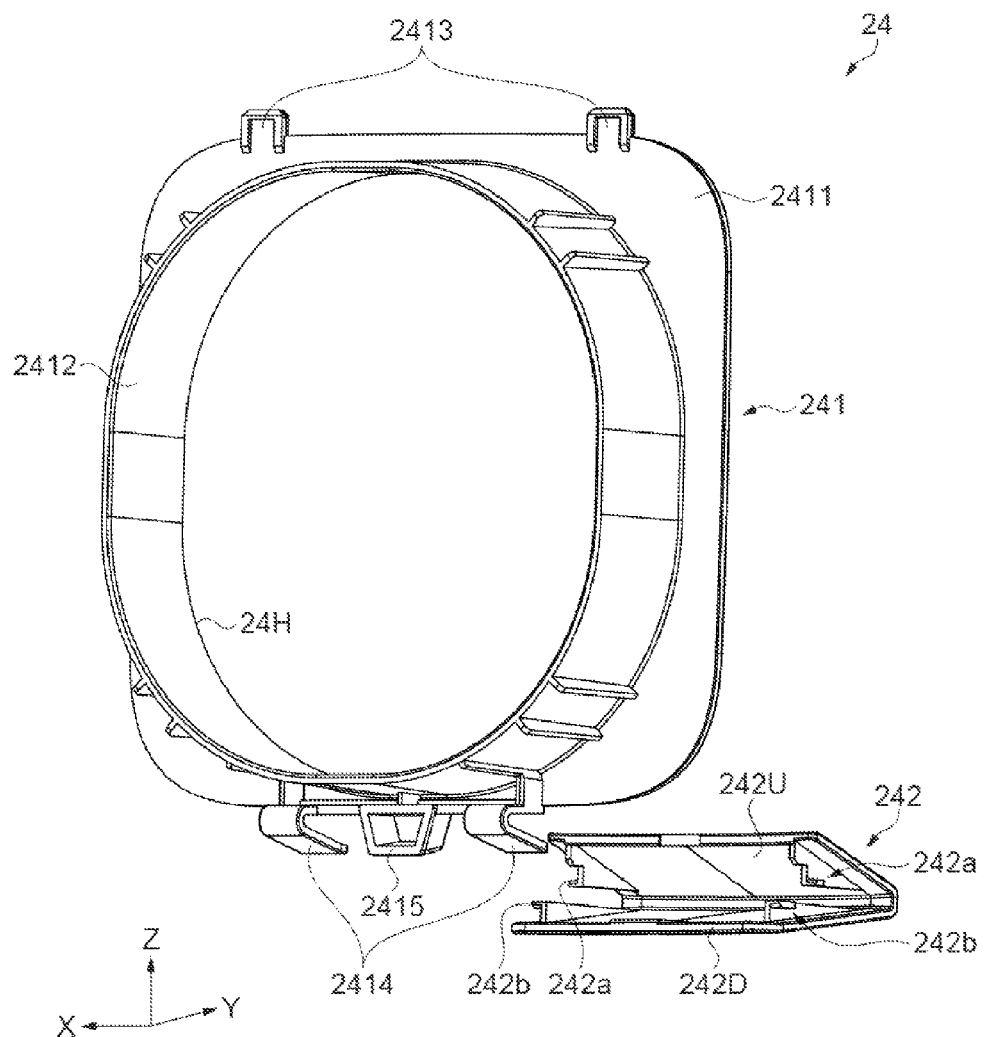
FIG. 12 is an exploded perspective view of a cover of the embodiment.

FIG. 12 is an exploded perspective view of the cover 24.

The cover body 241 includes a frame portion 2411 laminated on the bottom surface 231A of the front case 23 and covering the fixing screws 6A, the adjusting screws 6B and the shipping screws 6C as illustrated in FIG. 10 and FIG. 12, and the frame portion 2411 is provided with an opening portion 24H in which the lens barrel 361 of the projection lens 36 is inserted. Then, the frame portion 2411 is provided with a ring-shaped portion 2412 projecting rearward from a peripheral edge of the opening portion 24H, a pair of projecting portions 2413 projecting upward from an upper edge portion, and a pair of locking portions 2414 projecting from lower edge portion.

The ring-shaped portion 2412 is formed to have a size which can be inserted into the opening portion 231H of the front case 23. A pair of projecting portions 2413 are formed so as to be insertable into engaging holes 232 of the front case 23.

A pair of locking portions 2414 are formed so as to be insertable between the pair of the opposed surfaces 231C of the front case 23, extend rearward from the frame portion 2411 as illustrated in FIG. 12, are bent forward, so as to have resiliency in the vertical direction.

The locking portions 2414 is formed so as to engage a first engaging portion 233a when the cover body 241 is mounted on the front case 23 as illustrated in FIG. 11. More specifically, the locking portions 2414 engages a rear end of the first engaging portion 233a at a distal end thereof by being restricted from moving downward by the extending portion 233c.

The cover body 241 is formed with a substantially parallelepiped receiving portion 2415 between a pair of the locking portions 2414 as illustrated in FIG. 10 and FIG. 12. The receiving portion 2415 is positioned above the hook portion 234F and formed so as to be apart from the deflecting portion 234A when the cover body 241 is mounted on the front case 23.

The front surfaces of the locking portions 2414 and the receiving portion 2415 are formed so as to be positioned behind the front surface of the frame portion 2411, and a shoulder portion 241A is formed between the front surfaces of the locking portions 2414 and the receiving portion 2415 and the front surface of the frame portion 2411 as illustrated in FIG. 10.

The cover body 241 is mounted on the front case 23 by inserting the projecting portions 2413 into the engaging holes 232 of the front case 23, then pressing the lower side of the frame portion 2411 rearward, thereby engaging the locking portions 2414 with the first engaging portion 233a.

The auxiliary member 242 is formed into a V-shape in cross section as illustrated in FIG. 12, includes an upper member 242U forming one side of the V-shape and located on the upper side and a lower member 242D forming the other side of the V-shape and located on the lower side, and is formed into a substantially lateral symmetry with respect to a Y-Z plane.

The outer surface of the upper member 242U is formed so as to follow a side surface 231B of the front case 23, and an outer surface of the lower member 242D is formed so as to follow a surface of the front case 23 on the lower side.

As illustrated in FIG. 10, the lower member 242D is formed with a substantially rectangular through hole 242H in plan view at a position corresponding to the hook portion 234F of the front case 23.

As illustrated in FIG. 12, a pair of projecting portions projecting toward the lower member 242D are formed at edge portions on both sides of the upper member 242U in the lateral direction, and the pair of projecting portions are each provided with a first projecting portion 242a projecting in the direction away from each other (±X direction).

Also, a pair of projecting portions projecting toward the upper member 242U are formed at edge portions on both sides of the lower member 242D in the lateral direction, and the pair of projecting portions are each provided with a second projecting portion 242b projecting in the direction away from each other (±X direction).

When the auxiliary member 242 is placed on the shoulder portion 231D of the front case 23 and is pressed, the hook portion 234F of the front case 23 engages an edge portion of the through hole 242H (not illustrated), so that the auxiliary member 242 is assembled to the front case 23 and the cover body 241.

The auxiliary member 242 is arranged in such a manner that the first projecting portions 242a are positioned in the vicinities of a position below the first engaging portions 233a in a state of being assembled to the front case 23 and the cover body 241 as illustrated in FIG. 11, and the second engaging portion 233b is clamped between the lower member 242D and the second projecting portions 242b. Accordingly, the auxiliary member 242 is desirably fitted to the shoulder portion 231D of the front case 23 and the shoulder portion 241A of the cover body while suppressing the opening between the upper member 242U and the lower member 242D, and is arranged so as to extend along the outer surface of the front case 23 as illustrated in FIG. 2.

The cover body 241 is fixed to the front case 23 by the assembly of the auxiliary member 242.

In contrast, the auxiliary member 242 is removed from the front case 23 and the cover body 241 by being released from engagement by pressing the hook portion 234F engaging the edge portion of the through hole 242H by a member which can be inserted into the through hole 242H, for example, by a distal end or the like of a screw driver which rotates the adjusting screws 6B from below the projector 1 although illustration is omitted. The deflecting portion 234A is set to come into abutment with the receiving portion 2415 when the hook portion 234F is pressed by an amount more than predetermined amount, so that prevention of breakage of the deflecting portion 234A is achieved.

The cover body 241 may be released from the engagement of the locking portions 2414 with respect to the first engaging portion 233a by the removal of the auxiliary member 242, whereby the cover body 241 is allowed to be removed from the front case 23.

In this manner, the cover 24 is demountably mounted on the front case 23 with a configuration not using other members such as screws.

As described thus far, according to the embodiment, the following effects are achieved. (1) Since the projector 1 is provided with the adjusting mechanism 6 described above, the inclination of the projection lens 36 with respect to the optical unit body 30 under its own weight may be adjusted. Therefore, the projector 1 is capable of projecting an image in which out-of-focus within the projecting surface is suppressed.

In addition, since the fixing screws 6A are loosened when adjusting the inclination, adjustment is achieved without applying an excessive load on the members such as the supporting portion 8, the base portion 7, and the clamping portion 9. Therefore, the projector 1 which can adjust the inclination of the projection lens 36 by suppressing increase in size and weight of the adjusting mechanism 6 and hence the projector 1 without the necessity of excessively reinforcing the respective members may be provided.

(2) Since the adjusting mechanism 6 has a configuration which can be applied to the structure in which the projection lens 36 is fixed to the supporting portion 8 with a screw or the like in addition to the supporting structure of the projection lens 36 by using the bayonet structure described in the embodiment given above, the projector 1 which can adjust the inclination of the projection lens 36 is achieved without being restricted by the supporting structure of the projection lens 36.

(3) Four of the adjusting screws 6B are provided and are arranged on both sides in the perpendicular plane and the horizontal plane including the optical axis 36j. Accordingly, the inclination of the projection lens 36 in the perpendicular direction (vertical direction) can be adjusted in the posture of installation of the projector 1 by the adjusting screws 6B arranged on both sides in the horizontal plane, and the inclination of the projection lens 36 in the horizontal direction (lateral direction) can be adjusted in the posture of the installation of the projector 1 by the adjusting screws 6B arranged on both sides of the perpendicular plane. Therefore, the distance between the base portion 7 and the supporting portion 8 may be adjusted in a well balanced manner, and the adjusting operation for adjusting the inclination of the projection lens 36 may be efficiently performed.

(4) The distance between the base portion 7 and the supporting portion 8 may be adjusted by changing the amount of projection of the adjusting screws 6B from the base portion 7 by rotating the same and bringing the head portions 6Bh into abutment with the supporting portion 8 (the screw receiving portions 87). Accordingly, since the connection between the supporting portion 8 and the adjusting screws 6B is not necessary, the distance between the base portion 7 and the supporting portion 8 can be adjusted in a simple configuration and a simple operation, and hence the inclination of the projection lens 36 can be adjusted.

(5) Since the lens barrel 361 of the projection lens 36 does not need a portion projecting outward except for the projecting portions 3611, simplification of manufacture and reduction in weight of the lens barrel 361 are enabled.

(6) The exterior housing 2 is provided with the cover 24 configured to cover the fixing screws 6A, the adjusting screws 6B, and the shipping screws 6C, configured to be demountably mountable with respect to the front case 23. Accordingly, the cover 24 can be removed easily from the front case 23 when adjusting the inclination of the projection lens 36, and the cover 24 can be mounted on the front case 23 easily when the adjustment is terminated. Accordingly, members other than the cover 24 from among the members which constitute the projector 1 need not to be disassembled, so that the adjustment of the inclination of the projection lens 36 can easily achieved and, simultaneously, improvement in appearance of the projector 1 when the cover 24 is mounted is achieved.

Since the cover 24 is laminated on the bottom surface 231A of the front case 23, the outside of the ring-shaped portion 2412 of the opening portion 231H is effectively closed, so that entry of dust into the projector 1 from the outside may be suppressed.

(7) The cover 24 is mounted on the front case 23 by engaging the auxiliary member 242 with the cover body 241 and the front case 23. Accordingly, the cover 24 can be mounted on the front case 23 easily without providing members such as screws for mounting the cover 24 or without using a tool or the like.

(8) Since the adjusting mechanism 6 is provided with the shipping screws 6C, reliable fixation of the projection lens 36 is enabled even when the projection lens 36 having a light weight is used and hence the adjustment of the inclination is not necessary (when the head portions 6Bh are not brought into abutment with the screw receiving portions 87).

Modification

The embodiment described above may be modified as described below.

The projector 1 of the embodiment described above includes the lens shift mechanism 5, and the adjusting mechanism 6 is configured to be supported by the lens shift mechanism 5. However, a configuration in which the lens shift mechanism 5 is not provided, and the base portion 7 is fixed to the head member 37 or a configuration in which the base portion 7 and the head member 37 are integrally formed is also applicable.

The configuration to cause the supporting portion 8 to support the projection lens 36 is not limited to the bayonet structure in which the leaf springs 6sp are used described in the embodiment given above, and a configuration in which the projection lens 36 is fixed to the supporting portion 8 by using screws is also applicable.

The adjusting member of the embodiment is composed of the adjusting screws 6B having the head portions 6Bh, and the head portions 6Bh are configured to come into abutment with the supporting portion 8 to adjust the distance between the base portion 7 and the supporting portion 8. However, the adjusting member may be configured in such a manner that one end side is connected to the supporting portion 8 by screwing, and the other end side is axially supported by the base portion 7 so as to be rotatable so that the distance between the base portion 7 and the supporting portion 8 may be adjusted by the rotating the adjusting member.

The release button of the locking mechanism which restricts the rotation of the projection lens 36 may be configured to be covered with the cover 24. Accordingly, antitheft of the projection lens 36 is achieved together with improvement of the appearance of the projector 1 by preventing the release button from being exposed to the outside.

It is also possible to arrange a cushion member between the cover 24 and the front case 23. Accordingly, entry of dust from the outside to the inside of the projector 1 may further be suppressed.

The lens shift mechanism 5 of the embodiment is configured to be a manually operating system. However, an electrically operating system provided with a motor or the like is also applicable.

Although the projector 1 in the embodiment described above employs the transmissive liquid crystal light valve 43 as the light modulating apparatus, a reflective liquid crystal light valve may also be employed. The light modulating device may employ a device or the like including a micro mirror array.

The light source 311 is not limited to a discharge type lamp and may be configured with a solid light source such as lamps of other systems, or light-emitting diodes.

What is claimed is:

1. A projector comprising:
    an optical unit body having a light modulating apparatus configured to modulate an optical flux emitted from a light source according to image information;
    a projection lens configured to project the optical flux modulated by the light modulating apparatus; and
    an adjusting mechanism configured to adjust an inclination of the projection lens with respect to the optical unit body, wherein
    the adjusting mechanism includes:
        a supporting portion configured to support the projection lens;
        a base portion configured to constitute part of the optical unit body;
        a clamping portion configured to clamp the base portion in cooperation with the supporting portion;
        a fixing member configured to fix the supporting portion to the clamping portion; and
        a plurality of adjusting members protruding from the base portion and configured to be capable of adjusting a distance between the base portion and the supporting portion the adjusting members each including a head portion at one end portion thereof and an opposite end portion thereof being screwed into the base portion,
    when the adjusting mechanism adjusts the inclination, the supporting portion and the clamping portion are supported by the base portion in a condition that the fixing member is loosened, and
    when the inclination of the projection lens is set, the fixing member is tightened such that the supporting portion is held in abutment with the head portions of the plurality of adjusting members.

2. The projector according to claim 1, wherein
    the adjusting members are arranged on both sides of a first plane in a perpendicular direction and on both sides of a second plane in a horizontal direction, each of the first plane and the second plane extending along an optical axis of the projection lens in a posture of installation of the projector.

3. The projector according to claim 2, wherein
    the supporting portion and the clamping portion are fixed by a plurality of the fixing members; and
    the plurality of the fixing members are arranged in a vicinity of two of the adjusting members that are respectively positioned above the projection lens and below the projection lens.

4. The projector according to claim 1, wherein
    the adjusting members each support the supporting portion by coming into abutment at the head portion thereof with the supporting portion by being rotated, thereby adjusting the distance between the base portion and the supporting portion.

5. The projector according to claim 4, wherein the head portions of the adjusting members are each disposed between the base portion and the supporting portion.

6. The projector according to claim 4, wherein:
    the fixing member extends through the supporting portion, and
    the adjusting members do not extend through the supporting portion.

7. The projector according to claim 1, further comprising:
    an exterior housing constituting an exterior, wherein
    the exterior housing includes:
        a first housing including the fixing member and an opening portion configured to expose the adjusting members, and a second housing configured to cover the fixing member and the adjusting members and configured to be mountable/demountable with respect to the first housing.

8. The projector according to claim 7, wherein the second housing includes:
    a cover body configured to cover the fixing member and the adjusting members, and
    an auxiliary member engaged with the first housing and the cover body, and fixes the cover body to the first housing.

9. The projector according to claim 1, wherein the adjusting mechanism is configured to fix the projection lens at a plurality of different inclinations of the projection lens with respect to the optical unit body.

10. The projector according to claim 1, further comprising:
    a lens shift mechanism configured to include the base portion which is movable in a vertical direction and a left and right movable portion which is movable in a lateral direction.

11. The projector according to claim 1, wherein the supporting portion includes a plurality of adjusting member receiving portions configured to abut the head portions of the plurality of adjusting members, each of the adjusting member receiving portions including a through hole.

12. The projector according to claim 11, wherein the adjusting members do not extend through the through holes of the corresponding adjusting member receiving portions.

* * * * *